United States Patent Office

3,631,074
Patented Dec. 28, 1971

3,631,074
PROCESS FOR THE PRODUCTION OF SUBSTITUTED ANTHRAQUINONES
Hans-Samuel Bien, Burscheid, and Walter Hohmann and Heinrich Vollmann, Leverkusen, Germany, assignors to Farbenfabriken Bayer Aktiengesellschaft, Leverkusen, Germany
No Drawing. Continuation-in-part of abandoned application Ser. No. 710,640, Mar. 5, 1968, which is a continuation-in-part of abandoned application Ser. No. 390,244, Aug. 17, 1964. This application Nov. 24, 1969, Ser. No. 879,630
Int. Cl. C01b 1/10
U.S. Cl. 260—383      8 Claims

ABSTRACT OF THE DISCLOSURE

A process for the production of an α-chlorinated anthraquinone having hydroxy substituents in the 1,4-positions which comprises chlorinating at a temperature of 50–120° C. a boric acid complex of a 1,4-dihydroxy-anthraquinone or a boric acid complex of a 1,4-dihydroxy-anthraquinone having 1 to 2 chlorine atoms in the 2-, 3-, 5-, 6-, 7- or 8-positions but with at least one of the 5- and 8-positions unsubstituted, in a solvent selected from the group consisting of sulphuric acid containing $SO_3$ and chlorosulphonic acid in the presence of iodine, sulphur chloride or iron-III-salts as halogenating catalyst and splitting off boric acid by hydrolysis.

---

This application is a continuation-in-part of application Ser. No. 710,640 filed Mar. 5, 1968, now abandoned, which in turn is a continuation-in-part of application Ser. No. 390,244 filed Aug. 17, 1964, now abandoned.

The present invention relates to the production of anthraquinone dyestuffs and intermediates useful in making dyestuffs for synthetic fibres.

It has been found that 1,4-dihydroxy-anthraquinone which may be substituted by 1 to 2 chlorine atoms in the 2-, 3-, 5-, 6-, 7- or 8-positions but with at least one of the 5- or 8-positions unsubstituted can be selectively chlorinated in the 5- and/or 8-position by chlorinating at 50–120° C. boric acid complexes of 1,4-dihydroxy-anthraquinone which may be further substituted by 1 to 2 chlorine atoms in the 2-, 3-, 5-, 6-, 7- or 8-positions but with at least one of the 5- and 8-positions unsubstituted, in sulphuric acid containing $SO_3$ or in chlorosulphonic acid as solvent, in the presence of halogenating catalysts, and subsequently hydrolyzing the chlorinated boric acid complex compounds to split off the boric acid.

As solvents for the chlorination according to the invention there may be used oleum and chlorosulphonic acid. The concentration of the starting products to be chlorinated in the solutions can be varied within wide limits. The solvent is preferably used in excess, for example 10 to 20 times the amount, by weight, calculated on the anthraquinone.

Since, as is known, boric acid complex compounds are readily formed by introducing boric acid into an oleum solution of hydroxy-anthraquinones and are split again by pouring into bisulphite-containing water, the formation of the boric acid complex does not constitute a complication of the process but is taken advantage of in the present invention.

For the process according to this invention sufficient amounts of boric acid must be present in order to convert all hydroxyl groups of the compounds to be chlorinated into boric acid complexes, whereby an excess of boric acid may also be used. Without boric acid, the action of chlorine on hydroxy-anthraquinones of the said type leads to products which contain the chlorine completely or in part of the 2- and 3-positions. Care must also be taken that free $SO_3$ or chlorosulphonic acid is still present after the formation of the boric acid complexes, since otherwise the absorption of chlorine proceeds only slowly and possibly even at an undesired place.

As halogenating catalysts, compounds may be used which have been described for this purpose in the literature, in so far as they are sufficiently stable under the conditions applied and are either sufficiently soluble in the solvent or can be brought into and maintained in a very fine dispersion. Without excluding other catalysts, the following may be mentioned: sulphur chloride, iron-III-salts and particularly iodine. They are added to the product to be chlorinated in quantities of 0.1–5 percent by weight.

The chlorination is carried out at temperatures between 50 and 120° C., preferably at 60 to 120° C., and most preferably at 60 to 90° C. The reaction time depends on the temperature chosen, the type of solvent, the amount and degree of dispersion of the halogen carrier and on the distribution of chlorine in the liquid. By modifying these factors, the rate of the reaction can be varied within wide limits. In general, a period of 1–8 hours is required.

The change of color of the solution during the reaction gives a first indication for determining the end product of the chlorination. Another aid is the chromatographic examination of samples which gives an adequate indication of the decreasing amount of starting products and the increasing formation of the desired products. The determination of the final point is not particularly critical, since in the process according to the invention the further absorption of chlorine proceeds only very slowly after the 5- and 8-positions have been occupied, and the boric acid complexes are quite stable to excess chlorine. To ensure an economical utilization of the chlorine and to obviate inconvenient waste gases, it is advisable to work in a closed system. If this is evacuated at the start and sufficient $SO_3$ is added to the melt to convert the hydrochloric acid formed during the reaction completely into chlorosulphonic acid, the approximately theoretical amount of chlorine will suffice. This type of chlorination is the preferred method on a technical scale.

As can be seen from the examples, the yields obtained are practically quantitative and very close to theory. In many cases the quality of these crude products will be sufficient. If a higher degree of purity is desired, the chlorination products can be separated immediately after chlorination by reducing the acid concentration, subsequent isolation and decomposition with water.

The anthraquinones obtained according to the invention dye synthetic fibres, especially polyester fibres, in intense shades, but they are chiefly valuable intermediate products for the manufacture of vat, dispersion, pigment and acid wool dyestuffs.

The following non-limitative examples illustrate the invention.

EXAMPLE 1

13.6 g. of anhydrous boric acid are introduced in portions, while cooling, into 130 g. of a mixture of equal parts by weight of 65% oleum and sulphuric acid monohydrate. When the resulting evolution of heat has subsided, 24 g. of quinizarin and 0.5 g. of finely powdered iodine are added, the mixture is subsequently diluted with 170 ml. of 5% oleum and chlorine is introduced into the melt at 60–70° C. with vigorous mixing, until the starting material can no longer be detected by chromatographic examination of a sample.

After the excess chlorine is driven out of the melt, this is poured into 2.5 litres of water to which sufficient bisulphite has been added, the resultant precipitate is filtered off, washed hot until neutral, and dried.

Yield: 29.2 g. corresponding to 95% of theory: chlorine content 23.2% (theoretical value for dichloro-quinizarin 23.0%), pale red powder. After redissolving it from 10 times the amount by volume of dimethyl formamide, there are obtained 25.5 g. (=87% of the starting material corresponding to 83% of theory) of 1,4-dihydroxy-5,8-dichloro-anthraquinone in the form of red needles of M.P. 273–278° C.; M.P. of the pure product 283–284° C. (corr.). The substance is identical with a preparation obtained from 3,6-dichlorophthalic acid anhydride by reaction with hydroquinone in an aluminium chloride/sodium chloride melt.

When the same reaction is carried out without boric acid in such a manner that at the start of the chlorination the percentage content of $SO_3$ in the solution is the same as above, then the quinizarin rapidly takes up chlorine already at 30° C. with a vigorous evolution of heat, and products which are chlorinated in the 2-position result.

EXAMPLE 2

To a mixture of 53 g. of 65% oleum and 13.6 g. of boric acid there are added 200 ml. of chlorosulphonic acid, followed by 24 g. of quinizarin and 1 g. of iodine. Chlorination is then carried out at 70° C. until no more starting material is indicated in a sample.

After working up analogously to Example 1, 29.4 g. corresponding to 95.5% of theory of crude 5,8-dichloroquinizarin are obtained. After redissolving from 10 times the amount by volume of dimethyl formamide there remain 24.1 g. of M.P. 272–277° C.

EXAMPLE 3

When using in Example 1, instead of quinizarin, the equimolecular quantity of 5-chloro-quinizarin, chlorinating in the same manner until the starting material has disappeared, and working up analogously, the same 5,8-dichloro-quinizarin is obtained in a yield of 96%.

EXAMPLE 4

In a vessel of 100 litres capacity with a stirring device which ensures an effective mixing of liquid and gaseous contents, there are first introduced 4.5 kg. of boric acid and then 6 kg. of quinizarin and 150 g. of iodine into 100 kg. of 20% oleum. The vessel is then evacuated to a low-pressure of about 400 mm. Hg, the low-pressure is compensated with gaseous chlorine, and finally an excess chlorine pressure of 1–2 atmospheres is adjusted. Starting at a temperature of about 70° C. a rapid absorption of chlorine takes place which can easily be assessed by the fall of the pressure while the chlorine valve is shut. Since no waste gas is formed, the chlorine absorption can be exactly assessed by weighing the chlorine pressure vessel and controlled by the chlorine supply. Before taking samples, the internal pressure is allowed to drop briefly to zero.

When no more starting material is indicated in a sample, the cooled melt is pressed into 500 litres of water containing bisulphite, the resultant suspension is heated until the boric ester is completely hydrolyzed, pressed at 80° C. into a filter press, washed until neutral and dried.

Yield: 7.1 kg. corresponding to 92% of theory.

The product is chromatographically identical with that obtained in Examples 1 and 2.

What is claimed is:

1. A process for the preparation of an anthraquinone of Formula I

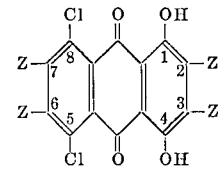

(I)

wherein Z is hydrogen or a halogen atom, and no more than two Z are halogen atoms, which consists of chlorinating at a temperature between 50° and 120° C. a boric acid complex of an anthraquinone of Formula II

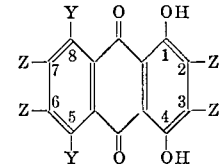

(II)

wherein Z is as defined above and wherein one Y in the 5- or in the 8-position is hydrogen and the other Y in the 8- or in the 5-position is chlorine or hydrogen, in a solvent which is sulphuric acid containing $SO_3$ or chlorosulphonic acid, in the presence of iodine, sulphur chloride or an iron-III-salt as the halogenating catalyst and splitting off boric acid by hydrolysis.

2. The process according to claim 1 wherein the temperature during the chlorination is between 60° and 90° C.

3. The process according to claim 1 wherein in the anthraquinone of Formula II Y and Z are hydrogen and in the anthraquinone of Formula I Z is hydrogen.

4. A process according to claim 1 in which the halogenating catalyst is iodine in an amount between 0.1 and 5%, by weight.

5. A process according to claim 1 in which the chlorination is continued for about 1 to 8 hours.

6. A process according to claim 1 in which the chlorination is carried out in a closed system.

7. A process according to claim 1 in which the sulphuric acid contains free $SO_3$.

8. A process according to claim 1 in which the solvent is present in amount between 10 and 20 times by weight the amount of said anthraquinone of Formula II.

References Cited

UNITED STATES PATENTS 3,316,280    4/1967    Vollmann et al. _____ 260—381

LORRAINE A. WEINBERGER, Primary Examiner

R. GERSTL, Assistant Examiner

U.S. Cl. X.R.

8—39, 40

UNITED STATES PATENT OFFICE
CERTIFICATE OF CORRECTION

Patent No. 3,631,074    Dated December 28, 1971

Inventor(s) Hans-Samuel Bien, Burscheid and Walter Hohmann and Heinrich Vollmann It is certified that error appears in the above-identified patent and that said Letters Patent are hereby corrected as shown below:

In the heading, please insert applicants' priority claim to German application F 40 552 filed August 21, 1963.

Signed and sealed this 21st day of November 1972.

(SEAL)
Attest:

EDWARD M. FLETCHER, JR.
Attesting Officer

ROBERT GOTTSCHALK
Commissioner of Patents